Figure 1:
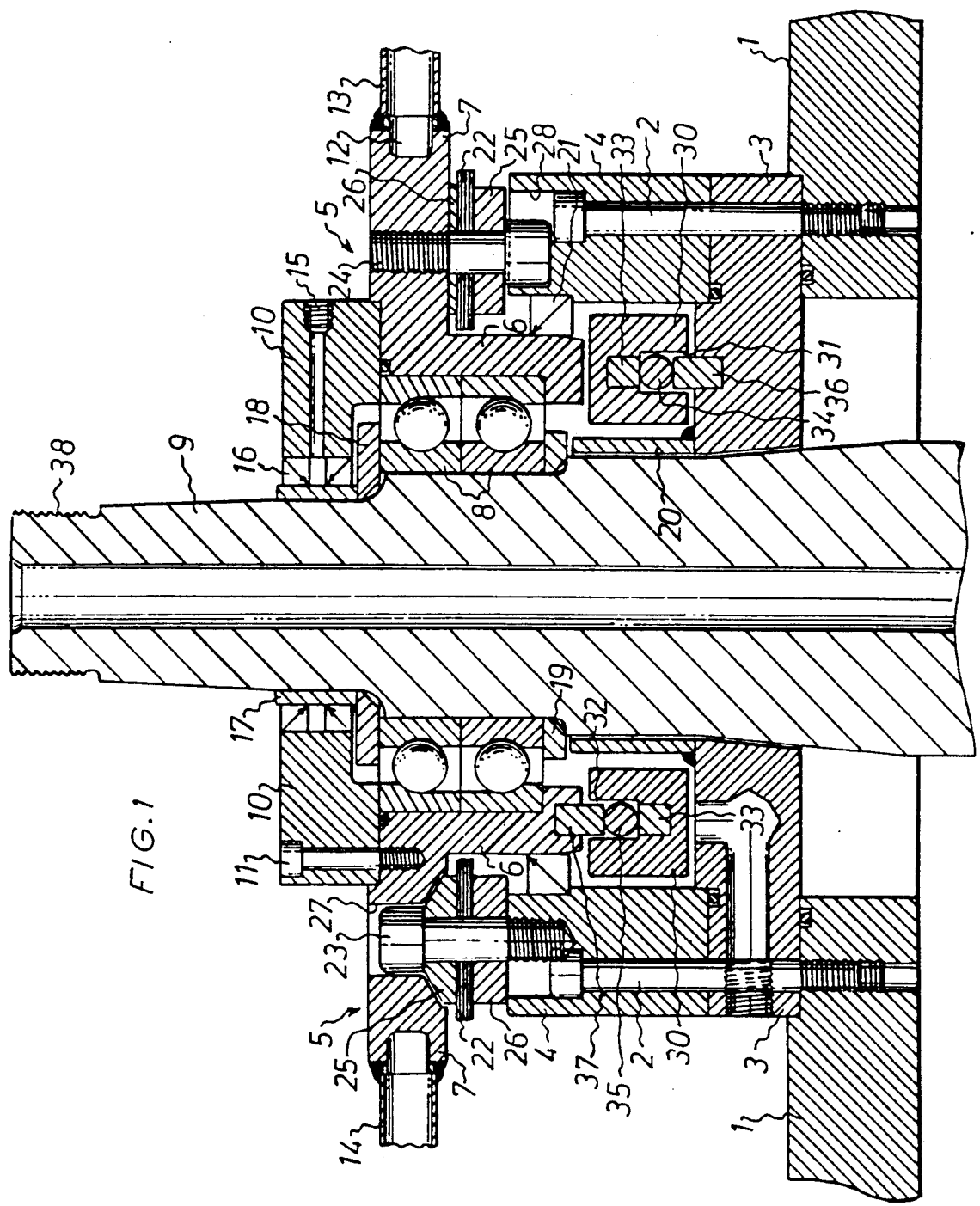

United States Patent [19]

Sigurdsson

[11] Patent Number: 5,061,088
[45] Date of Patent: Oct. 29, 1991

[54] DEVICE FOR ROTATABLY MOUNTING A MACHINE ELEMENT

[75] Inventor: Per-Arne Sigurdsson, Åskloster, Sweden

[73] Assignee: Hoganas AB, Askloster, Sweden

[21] Appl. No.: 613,562

[22] PCT Filed: Mar. 29, 1990

[86] PCT No.: PCT/SE90/00201
§ 371 Date: Nov. 28, 1990
§ 102(e) Date: Nov. 28, 1990

[87] PCT Pub. No.: WO90/12215
PCT Pub. Date: Oct. 18, 1990

[30] Foreign Application Priority Data

Mar. 30, 1989 [SE] Sweden ................................ 8901101

[51] Int. Cl.$^5$ .............................................. F16C 27/00
[52] U.S. Cl. ..................................... 384/535; 384/611
[58] Field of Search ............... 384/535, 536, 611, 542, 384/581, 620

[56] References Cited

U.S. PATENT DOCUMENTS 2,530,323  11/1950  Boyd .................................... 384/611
4,235,483  11/1980  Schulze ................................ 384/535
4,366,995  1/1983   Kocian ................................. 384/536
4,915,514  4/1990   Söderlund ........................... 384/611

*Primary Examiner*—Lenard A. Footland
*Attorney, Agent, or Firm*—Kane, Dalsimer, Sullivan, Kurucz, Levy, Eisele and Richard

[57] ABSTRACT

A device for mounting a machine element, such as a shaft (9). According to a first aspect of the invention, a bearing housing (5) is mounted on a machine body (1) by means of a plate-shaped supporting means (22) having a main plane perpendicular to the shaft (9). The supporting means (22) is rigidly connected with both the machine body (1) at first points of attachment (23), and with the bearing housing (5) at second points of attachment (24) which, in the main plane, are separate from the first points of attachment (23). The supporting means (22) has a rigidity in its main plane and a corresponding flexibility across its main plane, so as to be capable of transmitting substantially radial load and so as to permit, by deflection between the first and the second points of attachment (23, 24), a movement of the bearing housing (5) in relation to the machine body (1). The invention also relates to a structure for transmitting axial bearing load, which comprises an annular retainer (30) which is centered with respect to the shaft (9) and has two pairs of diametrically opposed recesses (31, 32), said pairs being at an angle of 90° to one another. The recesses (31) in the first pair and the recesses (32) in the second pair are open in opposing axial directions. Four rolling elements (34, 35) are loosely received in the recesses (31, 32). The rolling elements (34) in the first pair have rolling contact with and form a first axis of rotation relative to the machine body (1), and the rolling elements (35) in the second pair have rolling contact with and form a second axis of rotation relative to a bearing housing associated with the structure at issue.

15 Claims, 4 Drawing Sheets

DEVICE FOR ROTATABLY MOUNTING A MACHINE ELEMENT

The present invention relates to a device for rotatably mounting a machine element, such as a shaft, on a machine body or the like, said device comprising a bearing housing mounted on said machine body, and a bearing member supported by said bearing housing and adapted to guide the shaft. A first aspect of the invention concerns a device for transmitting substantially only radial load, a second aspect of the invention concerns such a device for transmitting radial load in combination with a structure for taking up axial force, and a third aspect of the invention concerns such a structure for taking up axial force.

The bearing member of the device according to the invention need not be of any particular type but may be in the form of, for example, rolling bearings, slide bearings, or magnetic bearings. Since the invention has been developed to obviate inconveniences in the use of rolling bearings, the following description focuses on this type of bearing.

The bearing housing in known bearing devices of the type mentioned by way of introduction must be manufactured and mounted with precision so that the bearing member will not be worn out prematurely because of unevenly distributed load. Thus, the bearing housing need be constantly axially aligned with respect to the shaft, and must usually have an absolutely round mounting hole for the bearing member.

It is especially important that the bearing housing is manufactured and mounted with precision when it is to be used together with so-called high-precision bearings which, when accurately mounted in precision-made bearing housings, provide a more exact guiding of the shaft and a longer service life for the bearing or, alternatively, a higher number of revolutions, in comparison with standard bearings. In a comparatively large machine structure with a rotating shaft mounted in rolling bearings, it may, for instance, be desirable to increase the number of revolutions of the shaft in order to achieve higher efficiency. However, an increased number of revolutions of the shaft entails an increased running speed of the rolling elements of the rolling bearings and, consequently, a shorter service life of said bearings. In most cases, it is not realistic to keep the running speed of the rolling elements unchanged by reducing the diameter of the shaft, considering the ensuing impaired rigidity of the shaft and the cost of a possible exchange of said shaft. An alternative would be to use high-precision bearings but, for a large machine structure, it is often difficult or impossible to manufacture the bearing housing with sufficient precision and to maintain said housing sufficiently centered and axially aligned relative to the shaft. Also, high-precision bearings can many times not be used in comparatively large machine structures since these structures in operation often reach different temperatures on different sides of the shaft or the bearing housing, resulting in an incorrect alignment of the bearing housing due to dimensional variations caused by the varying temperatures of the machine structure.

Another problem associated with bearing devices of the type mentioned by way of introduction is that, in plain radial bearings adapted to take up only radial shaft load, so-called fretting corrosion often occurs at the mounting surfaces of the bearings which are not fixedly clamped axially. Furthermore, a loose mounting of the bearing member axially may entail a certain radial play either adjacent to the inner ring or the outer ring of the bearing, which in operation may shorten the service life of the bearing member.

The object of the present invention is to obviate the above inconveniences associated with known bearing devices of the type mentioned by way of introduction.

Therefore, a first aspect of the invention concerns a device of the type mentioned by way of introduction, which is characterised in that the bearing housing is mounted on the machine body by means of a plate-shaped supporting means with a main plane perpendicular to the longitudinal direction of the shaft. On the one hand, the supporting means is rigidly connected with the machine body at first points of attachment and, on the other hand, rigidly connected with the bearing housing at second points of attachment which, in said main plane, are separate from the first points of attachment. Furthermore, the supporting means has an inherent rigidity in its main plane and a corresponding inherent flexibility across said main plane so as to be capable of taking up and transmitting to the machine body substantially only radial bearing load, and so as to permit, by deflection between the first and the second points of attachment, a movement of the bearing housing in relation to the machine body.

Accordingly, in this first aspect of the invention, there is obtained a kind of floating suspension of the bearing housing in relation to the machine body, which has the following advantages:

1. Due to the flexibility of the supporting means, the bearing housing and, consequently, the bearing member may be kept constantly axially aligned with respect to the shaft, which is not the case in conventional, rigid mounting of the bearing housing on the machine body.

2. Also due to the flexibility of the supporting means, the bearing housing and the bearing member can follow the shaft also if this is displaced purely axially in relation to the machine body, e.g. because of variations in the length of the shaft caused by varying temperatures. Thus, the above-mentioned inconveniences of fretting corrosion and radial play are avoided.

3. Despite the movability of the bearing housing according to points 1 and 2, the bearing housing can be maintained exactly centered relative to the machine body, due to the radial rigidity of the supporting means relative to the shaft.

4. At each bearing point, the forces between the shaft and the machine body are divided into purely radial forces and purely axial forces since the supporting means can transmit substantially only radial load. This causes a negligible uneven load on the bearing member, also when there is asymmetry between the shaft and the machine body, e.g. because of a downward deflection of the shaft, insufficient precision of the component parts, or differences in temperature of the shaft and/or machine body.

5. The bearing housing can be manufactured as a comparatively small unit which, when being mounted, can be centered relative to the shaft in that the supporting means is not fixed at the first or second points of attachment until the bearing housing has been positioned. Since the bearing housing can be manufactured as a comparatively small unit, it can also be made with greater precision. Thus, high-precision bearings may without difficulty be used also in comparatively large machine structures.

In a preferred embodiment, the plate-shaped supporting means consists of a ring which is concentric with the shaft and whose first and second points of attachment are alternately and substantially uniformly distributed circumferentially. In actual practice, this construction has been found to provide excellent rigidity radially, as well as satisfactory centering of the bearing housing.

The number of first and second points of attachment of the supporting means may vary, depending on the chosen material and its structure. In general, more points of attachment provide a more reliable radial guiding of the supporting means and, consequently, of the bearing housing, as well as an increased rigidity of said supporting means as to deflection across its main plane, i.e. an increased rigidity against angular changes and/or axial displacement of the bearing housing in relation to the machine body.

The supporting means need not be a ring, nor need it consist of a single element but may be made up of several components.

In a preferred embodiment, the bearing ring has four first points of attachment to the machine body, and four second points of attachment to the bearing housing.

The structure and the material of the plate-shaped supporting means should be chosen with the fact in mind that the supporting means is to transmit mainly only radial bearing load. Consequently, the rigidity of the supporting means should be considerably higher at right angles to the shaft than parallel to said shaft, at the same time as the construction should not be too frail. The preferred material is metal, e.g. stainless steel. Also, the supporting means preferably consists of a lamellar unit which is made up of a number of closely packed lamellae perpendicular to the shaft. Such a unit has essentially the same radial rigidity as an element in one piece with the same height, but has, compared with such a onepiece element, a higher flexibility across its main plane.

In view of the inconveniences caused by temperature variations in prior art bearing devices, it is suitable to choose for the supporting means a material with comparatively low thermal conductivity, and stainless steel has proved to be such a suitable material. The thermal barrier formed by the supporting means permits controlled cooling of the shaft and the bearing housing, and play and prestresses can thus be kept within given tolerances.

It is preferred that the main plane of the plate-shaped supporting means is axially centered with respect to the axial extension of the bearing member, such that the radial forces transmitted from the shaft to the bearing member are distributed as uniformly as possible axially over the bearing member so that this receives an axially even wear. If, for example, the bearing member is a unit of two rolling bearings disposed axially beside one another, such a centering of the main plane of the supporting means will result in equal radial load on the two rolling bearings. It should, however, be observed that the supporting means will, independently of its axial position relative to the bearing member, transmit substantially only radial forces and no axial forces or torques.

The above device according to the first aspect of the invention can take up substantially only radial load, which it does via the radially extended, plate-shaped supporting means. Possibly, the supporting means can transmit a limited amount of axial load, but in most cases a separate structure for taking up axial bearing load would probably be required.

A second aspect of the invention therefore concerns a structure adapted to be used in combination with the above radial bearing device and characterised, as to its function, in that it can transmit axial bearing load from the shaft to the machine body in a predetermined axial direction, without undoing what was gained by the provision of the plate-shaped supporting means, i.e. the floating suspension of the bearing housing and the division of the bearing load into purely radial load and purely axial load.

The distinctive features of this axial bearing structure will be described below, but it should be emphasised that axial shaft forces need not necessarily be transmitted to the machine body at precisely that or those bearing points which have plate-shaped supporting means. The structure for taking up axial load may just as well be disposed at another bearing point in the form of a purely axial bearing.

Furthermore, it is emphasised that the simplest embodiment of the structure for taking up axial force only takes up axial forces in a predetermined direction. In case axial forces are to be transmitted to the machine body in opposing shaft directions, two such structures may be mirror inverted and oppositely spring-loaded. Considering possible length variation and/or tilting due to temperature variations, a certain axial play may be required when two such mirror inverted structures for taking up axial load are used.

The axial force-transmitting structure is "cardanic" in character in that it can transmit axial forces also when the bearing housing/bearing member in which said structure is disposed, is slightly tilted. However, unlike a conventional cardan or universal joint, the structure according to the invention is radially "floating" with respect to the longitudinal direction of the shaft. By this radial movability of the structure, the flexibility of the plate-shaped supporting means is effectively maintained.

A preferred embodiment of the axial force-transmitting structure comprises an annular retainer which is concentric with the shaft and has two pairs of diametrically opposed recesses, said pairs being at an angle of 90° to one another. The recesses in the first pair are open in the predetermined axial direction (i.e. the direction in which the axial force is to be transmitted from the shaft to the machine body), and the recesses in the second pair are open in the opposite axial direction. The four rolling elements are loosely received each in one recess. The rolling elements in the first pair of recesses have rolling contact with and form a first axis of rotation relative to the machine body, and the rolling elements in the second pair of recesses have rolling contact with and form a second axis of rotation relative to a bearing housing associated with said structure and supporting a bearing member adapted to guide the shaft. Furthermore, the annular retainer for the rolling elements is radially movable with respect to the longitudinal direction of the shaft.

Preferably, the rolling elements received in the four recesses of the annular retainer consist of four balls, and the above-mentioned radial movability of the annular retainer for the rolling elements is preferably achieved in that radial rolling is possible between the four balls and the machine body or the bearing housing associated with said structure. A distinctive feature of this embodiment is that the function of the four balls is two-fold.

Firstly, the balls form the two above-mentioned axes of rotation of the annular retainer, which are perpendicular to one another, and secondly the balls, because they are loosely received in the recesses, give rise to a radial movability of the entire structure, which prevents said structure from taking up any radial load at all which, according to the first aspect of the invention, can be transmitted via one or more plate-shaped supporting means of the type described above.

Of particular interest is an embodiment of the invention in which the bearing housing in rolling contact with the axial force-transmitting structure is identical with the bearing housing suspended by means of the plate-shaped supporting means. Thus, a combined radial and axial bearing is obtained, having all the above-mentioned advantages of the invention.

Other preferred embodiments of the structure for transmitting axial load are stated in the appended claims.

A third aspect of the invention concerns a device of the type mentioned by way of introduction, which is characterised in that it comprises a cardan-type structure of the type described above for taking up axial force. This third aspect of the invention is especially applicable when the cardan-type structure for taking up axial force is used in combination with some other type of bearing for taking up radial force than the bearing device according to the first aspect of the invention.

Figure 2:
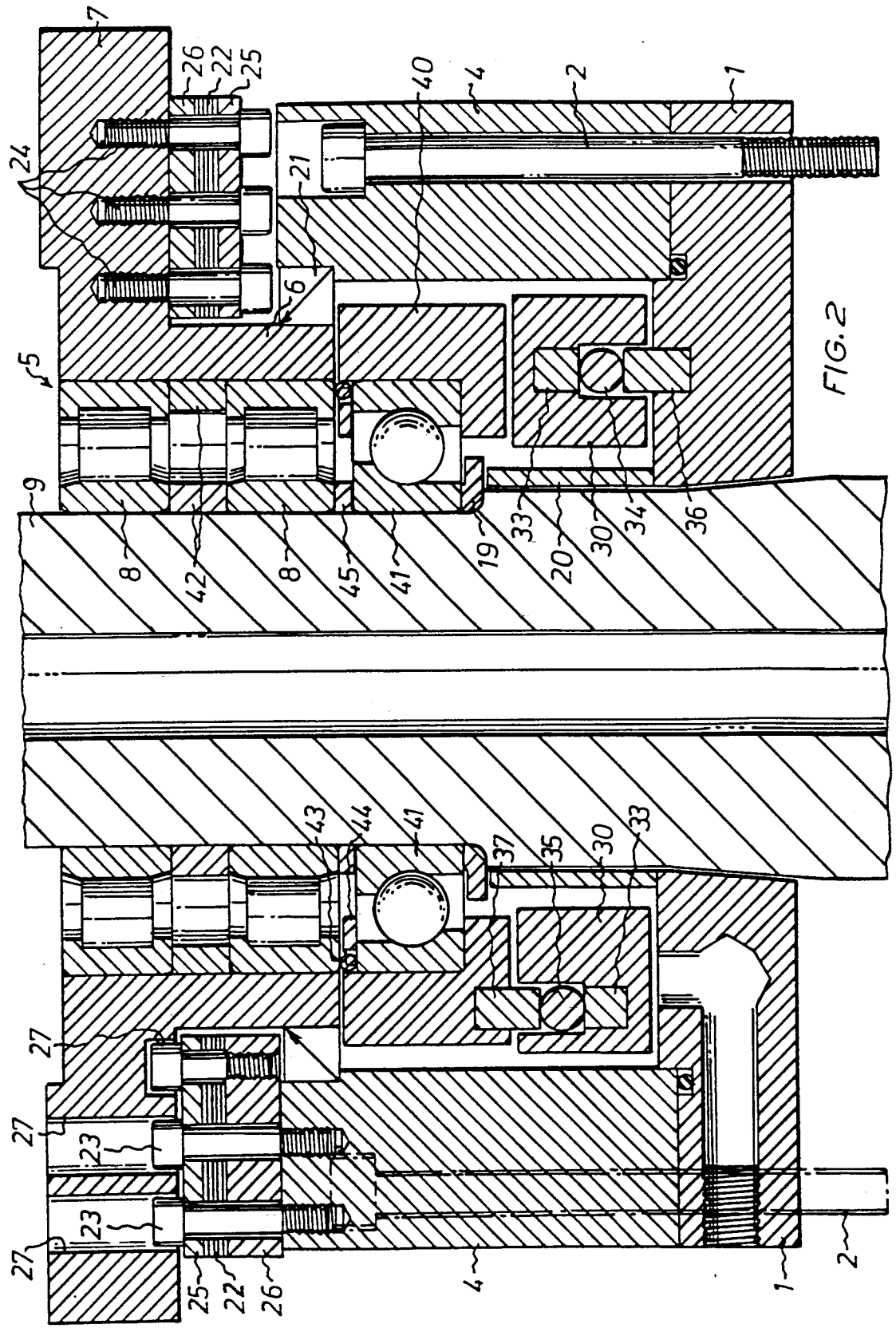
Figure 3:
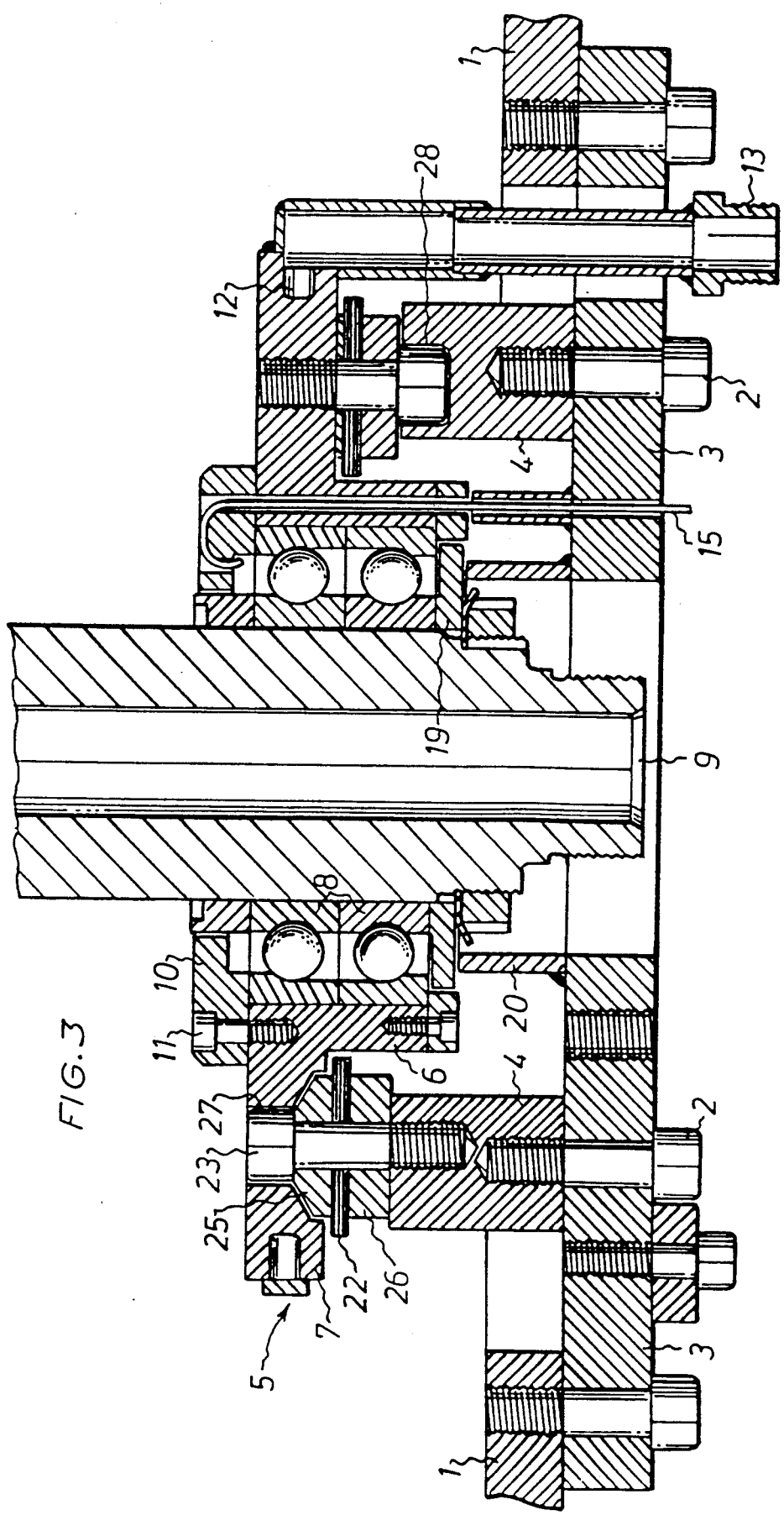
Figure 4:
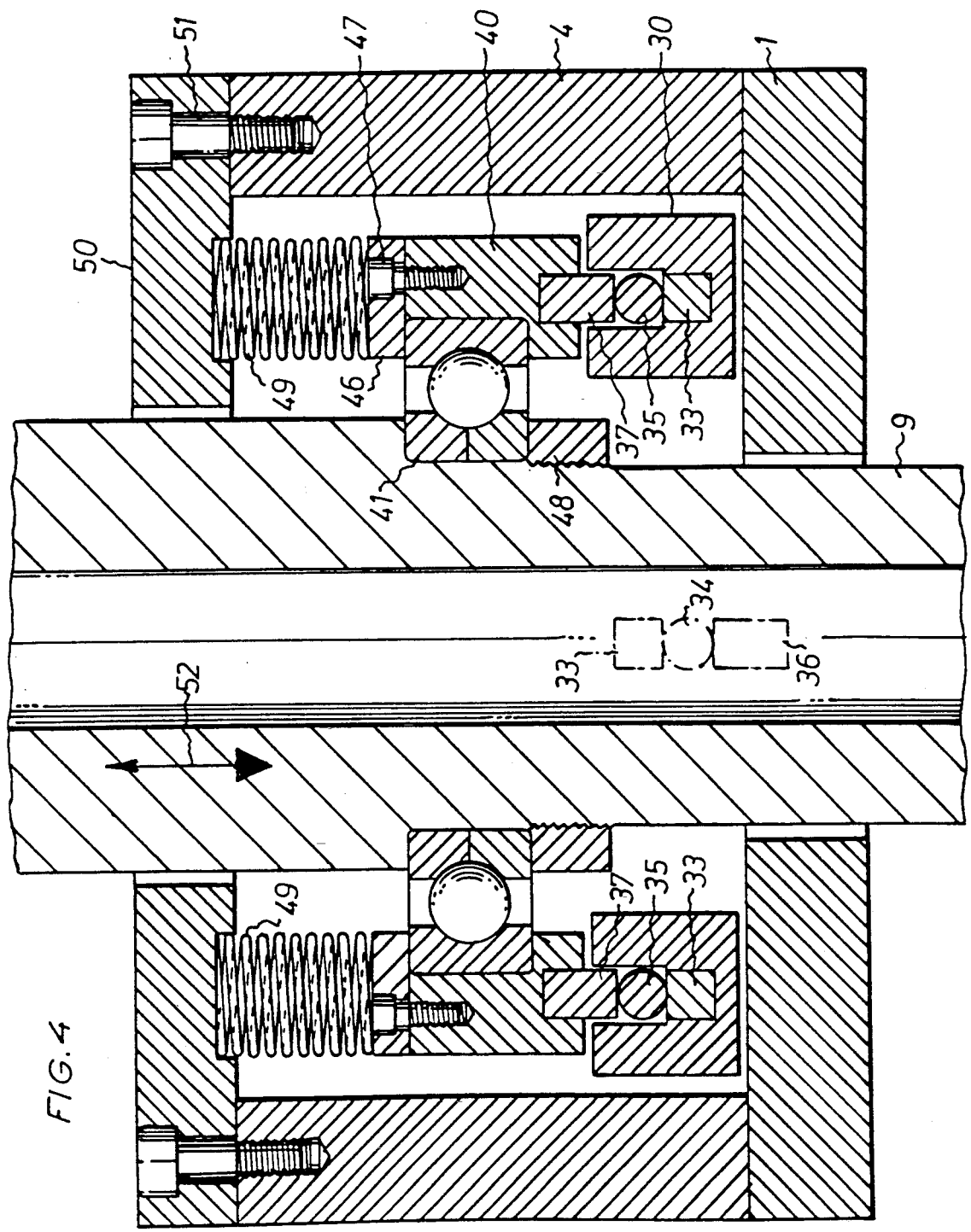

The invention will be described in more detail below, reference being had to the accompanying drawings in which FIG. 1 is an axial section of a first embodiment of the invention, FIG. 2 is an axial section of a second embodiment of the invention, FIG. 3 is an axial section of a third embodiment of the invention, and FIG. 4 is an axial section of a fourth embodiment of the invention.

In FIGS. 1-3, the axial section on one side of the shaft is turned through 90° relative to the section on the other side of said shaft.

The embodiment in FIG. 1 is adapted to take up radial as well as axial bearing load, but axial bearing load can only be taken up in a downward direction in FIG. 1.

The bearing device is mounted on a machine body 1 on which are fixedly mounted, by means of a number of mounting bolts 2, a horizontally extending annular base 3 for the bearing, and a bearing-supporting cylindrical mounting element 4 arranged on top of said base.

A bearing housing, in its entirety designated 5, is suspended from the mounting element 4 and essentially consists of a radially inner, axially extending bearing seat 6 and a radially projecting flange 7 associated therewith. The bearing housing 5 supports a bearing member 8 which in this case is made up of two angular-contact bearings in an X-arrangement. The outer rings of the ball bearings are supported by the bearing seat 6 without any radial play, and the inner rings of the ball bearings are press-fitted on a vertical shaft 9. The ball bearings 8 are maintained in place by a lid 10 which is fixed to the bearing housing 5 by means of a number of mounting bolts 11.

FIG. 1 also shows a cooling water pipe 12 with an inlet 13 and an outlet 14, provided in the periphery of the bearing housing 5 for cooling said housing and the bearing member 8. The lid 10 also comprises a radial oil inlet pipe 15. Furthermore, the device comprises two seals 16, an inner ring 17, an upper spacer ring 18, a lower spacer ring 19, an annular dust shield 20 attached to the base 3 adjacent to the shaft 9, and a seal 21 between the mounting element 4 and the vertical bearing seat 6 of the bearing housing 5. The functions of the last-mentioned components are apparent from FIG. 1 and therefore need not be further commented on.

The bearing housing 5 is suspended by means of an annular, radially extending lamellar unit 22 which, in the embodiment shown, comprises a number of closely packed lamellae of, for instance, stainless steel which has comparatively low thermal conductivity. The lamellar unit 22 is rigidly connected at first points of attachment with the mounting element 4 of the machine body 1 by means of bolts 23. At second points of attachment, said lamellar unit 22 is rigidly connected with the radially extending flange 7 of the bearing housing 5 by means of bolts 24. The number of bolts 23 and 24 may vary, but in the embodiment shown, the lamellar unit 22 is attached to the machine body 1 by means of two bolts 23 and with the bearing housing 5 by means of two bolts 24, these four bolts being alternately and uniformly distributed on the circumference of the annular lamellar unit 22. The fixing of said lamellar unit by means of the bolts 23 and 24 is carried out with the aid of supporting plates 25 and spacer plates 26 whose circumferential extension is restricted to an area around the bolt at issue.

The mounting holes in the lamellar unit 22 adapted to receive the bolts 23 and 24 preferably has a larger diameter than the bolt shank, at least for one set of bolts, i.e. either the bolts 23 or the bolts 24. Thus, it is possible to achieve a certain centering of the bearing housing 5 and the bearing member 8 with respect to the shaft 9 in connection with the fixing of the bolts 23 or 24, as the case may be. Consequently, no high-precision manufacturing of the machine body 1, the base 3 for the bearing, and the mounting element 4 is needed, nor is it necessary to assemble with precision these three components, or to accurately position the holes in the mounting element 4 for the bolts 23.

The radial lamellar unit 22 is adapted to transmit substantially only radial bearing load from the bearing housing 5 to the mounting element 4, as well as to permit angular change and/or axial displacement of the bearing housing 5 relative to the machine body 1. The radial bearing load is taken up in that the lamellar unit has an inherent rigidity in its main plane, it being naturally of importance that said lamellar unit is not displaced too much in axial direction relative to its undeflected position. Due to a corresponding inherent flexibility of the lamellar unit across its main plane, it is furthermore possible to incline and/or axially displace the bearing housing in relation to the machine body, while said unit 22 is slightly deflected between the bolts 23 and 24. In the embodiment shown, the lamellar unit 22 consists of lamellae of stainless steel, resulting in a certain spring action in axial direction. In other words, the lamellar unit can also take up a limited amount of axial load. For heavier axial loads, however, other measures are required which will be described in more detail below.

To make possible said movement of the bearing housing, there is a play in the area of the bolts 23 and 24. As shown to the left in the Figure, there is an annular gap between, on the one hand, the supporting plate 25 and the head of the bolt 23 and, on the other hand, the boundary wall of a recess 27 in the radial flange 7 of the bearing housing 5. In corresponding manner, there is an annular play between the heads of the bolts 24 and the boundary wall of the recesses 28 in the upper side of the mounting element 4, which serve to receive these bolt heads.

As mentioned above, the lamellar unit 22 can take up and transmit to the machine body 1 substantially only radial bearing load, and any possible axial bearing load has to be otherwise transmitted to said machine body 1. FIG. 1 shows a cardan-type structure adapted therefor, which comprises an annular ball retainer 30 which is maintained centered in an area between the lower surface of the bearing seat 6 and the upper surface of the base 3, radially inside the mounting element 4. The axial height of the annular ball retainer 30 is slightly smaller than the distance between the bearing seat 6 and the base 3.

The ball retainer 30 has two pairs of diametrically opposed recesses 31 and 32. The recesses 31 forming the first pair are downwardly open towards the base 3, and the recesses 32 forming the second pair are upwardly open towards the bearing seat 6 and situated at an angle of 90° relative to the downwardly open recesses 31. A roller 33 is flush-mounted in the bottom of each recess 31 and 32, for forming a rolling contact surface in said bottom. Furthermore, four balls 34 and 35 are loosely received in the recesses 31 and 32, respectively. The balls 34 in the downwardly open recesses 31 rest on two rollers 36 mounted in the upper side of the base 3. In corresponding manner, each of the other two balls 35 in the upwardly open recesses 32 have rolling contact with a roller 37 mounted in the lower surface of the bearing seat 6.

The rollers 36 and 37 partly project into the corresponding recesses 31 and 32, so as to ensure a centering of the ball retainer 30 relative to the shaft 9.

It should furthermore be observed that there is a radial play between the lateral surfaces of the rollers 36, 37 and the side walls of the corresponding recesses 31, 32, thus ensuring a radial movability of the ball retainer 30 with respect to the shaft 9 when the balls are rolling.

As to this structure, it should finally be observed that the circumferential length of the recesses 31, 32 is restricted to an area around each ball 34 and 35, such that the ball retainer 30 is prevented by its engagement with the rollers 36 and 37, from rotating about the shaft 9.

The function of the device shown in FIG. 1 will now be described in more detail. Assuming that the shaft 9 is subjected to both radial and axial forces which are to be transmitted to the machine body 1, and that, furthermore, said shaft 9 is subjected to a somewhat unevenly distributed load, e.g. by a tensile load being applied to a driving belt at the end 38 of the shaft 9. The shaft 9 is also assumed to be radially mounted at one more point located in a downward direction outside FIG. 1.

The radial and axial loads transmitted from the shaft to the bearing member 8 and the bearing housing 5 are divided into purely radial forces and purely axial forces. This is a direct consequence of, on the one hand, the capacity of the lamellar unit 22 to transmit radial load but no axial load and, on the other hand, the capacity of the cardan-type structure comprising the retainer 30 and the balls 34 and 35 to transmit axial forces but no radial forces. Consequently, the ball bearings forming part of the bearing member are not unevenly loaded, and the bearing housing 5 will at all times, due to the flexibility of the lamellar unit 22, be constantly axially aligned with the shaft 9. A possible angular change of the shaft 9 relative to the machine body 1 is not prevented by the ball retainer 30 which, as mentioned above, is radially movable.

FIG. 2 shows an embodiment with essentially the same bearing function as the embodiment in FIG. 1, but the structure for taking up axial load is considerably different. Components with the same functions in both embodiments have identical reference numerals in FIGS. 1 and 2.

Unlike the embodiment shown in FIG. 1, the embodiment in FIG. 2 comprises a second bearing housing 40 disposed between the upper bearing housing 5 and the ball retainer 30. This second bearing housing 40 supports an angular-contact bearing 41 adapted to take up downwardly directed shaft load. The two rollers 37, which in the embodiment in FIG. 1 are rigidly mounted in the underside of the bearing housing 5, are in the embodiment shown in FIG. 2 instead rigidly mounted in the underside of the second bearing housing 40, as shown to the left in FIG. 2. As to the angular-contact bearings 8 in FIG. 1, these have in FIG. 2 been replaced with two ball bearings 8 which can only take up radial load and which are separated by means of two spacer rings 42. A number of spacer balls 43 are mounted in a ring between the outer ring of the lower ball bearing 8 and the outer ring of the angular-contact bearing 41. These spacer balls 43 are maintained in place by means of a supporting ring 44 adapted therefor. Furthermore, a spacer ring 45 is arranged between the corresponding inner rings on the same level.

Due to the provision of the purely radial bearings 8 and the elimination of the contact 37 between the bearing housing 5 and the ball retainer 30, absolutely no axial bearing forces can be transmitted by the structure in FIG. 2 to the upper bearing housing 5 via the bearing members 8. Thus, all axial bearing load is definitely transmitted down to the machine body 1 via the angular-contact bearing 41, the second bearing housing 40, and the ball retainer 30.

It should also be observed that the number of bolts 23 and 24 at the first and second points of attachment of the lamellar unit 22 has been increased in the embodiment in FIG. 2 compared with that in FIG. 1.

As mentioned above, the cardan-type axial force-transmitting structure can only transmit axial load in a predetermined direction, namely downwards in FIGS. 1 and 2. If the shaft 9 is also subjected to upwardly directed axial forces, these forces have to be taken up in another way, for instance by a corresponding but mirror inverted cardan-type structure. If the shaft requires such an axial mounting in bearings in both axial directions, various constructions are conceivable. One alternative is to use two bearing devices according to FIG. 1, which are mirror inverted so that one bearing unit takes up axial forces in a first direction and radial forces, and the other bearing unit takes up axial forces in the second direction and radial forces as well. Another possibility is to use purely radial and purely axial bearings. In that case, a complete shaft bearing assembly would require four bearings: two radial bearings and two opposing axial bearings. A third alternative is to provide the device shown in FIG. 1 with an additional cardan-type and mirror inverted structure in the same bearing unit.

FIG. 3 shows an embodiment of a substantially purely radial bearing with no cardan-type structure of the type shown in FIGS. 1 and 2, for taking up axial force.

FIG. 4 illustrates a spring-loaded embodiment of the structure for taking up axial force. In principle, this embodiment corresponds to the one in FIG. 2, but the entire unit for taking up radial force has been dispensed with. Unlike FIGS. 1–3, FIG. 4 is furthermore a "genuine" axial section, as will be apparent from the fact that the two balls 35 are shown each on one side of the shaft 9, while one of the other two balls 34 is shown with dash-dot lines together with the associated rollers 33, 36. In this case, the axial bearing 41 consists of a four-point contact bearing which is axially fixed in its bearing housing 40 by means of a supporting plate 46 and bolts 47. The inner rings of the bearing member 41 are clamped against an abutment on the shaft 9 by means of a shaft nut 48.

The distinctive feature of the embodiment in FIG. 4 is that the bearing housing 40 is maintained pressed against the ball retainer 30 by means of a number of axially directed helical springs 49 which are clamped between the upper side of the supporting plate 46 and the underside of an end wall 50 which, by means of bolts 51, is fixedly attached to the body 4.

The two-way arrow 52 in FIG. 4 indicates that this spring-loaded structure can take up heavier axial forces in a direction towards the ball retainer 30 than in a direction towards the helical springs 49.

The invention has been described above with the aid of exemplifying embodiments which, however, naturally do not restrict the desired protective scope as defined in the appended claims. For instance, the annular supporting means need not be a ring, but may have another shape and be constructed of something else than closely packed lamellae. Furthermore, it is conceivable to use rollers instead of the balls 34, 35 for the cardan-type structure for transmitting axial force. In that case, the radial movability of the retainer 30 can be achieved in another manner, e.g. by letting the entire structure rest on a circular disc which, in its turn, rests on the base 3 via a number of balls.

I claim:

1. A device for rotatably mounting a machine element, (9), on a machine body (1), said device comprising:
   a bearing housing (5);
   a bearing member (8) supported by a housing (5) and adapted to guide said shaft (9); and
   a plate-shaped supporting means (22) for mounting the bearing housing (5) on the machine body (1), said supporting means (22) having a main plane perpendicular to the shaft (9) and being rigidly connected with the machine body (1) at first points of attachment (23), and with the bearing housing (5) at second points of attachment (24) which, in said main plane, are separate from the first points of attachment (23), and said supporting means (22) presenting, on the one hand, an inherent rigidity in its main plane and, on the other hand, a corresponding inherent flexibility perpendicular to said main plane so as to be capable of taking up and transmitting to the machine body (1) substantially only radial bearing load, and so as to permit, by deflection between said first and said second points of attachment (23, 24), a movement of the bearing housing (5) in relation to the machine body (1).

2. Device as claimed in claim 1, wherein the plate-shaped supporting means (22) consists of a ring which is centered relative to the shaft (9), and wherein said first and second points of attachment (23, 24) are alternately and substantially uniformly distributed circumferentially on said ring.

3. Device as claimed in claim 1, wherein the plate-shaped supporting means (22) consists of a lamellar unit formed of a number of closely packed lamellae parallel to said main plane.

4. Device as claimed in claim 3, wherein said lamellae are made of metal.

5. Device as claimed in claim 1, wherein said bearing member (8) has an axial extension and said main plane of the plate-shaped supporting means (22) is centered with respect to said axial extension of the bearing member (8).

6. Device as claimed in claim 1, further comprising a cardan-type structure adapted to transmit to the machine body (1) axial bearing load in a predetermined axial direction and including:
   an annular rolling element retainer (30) which is centered with respect to the shaft (9) and has two pairs of diametrically opposed recesses (31, 32), said pairs forming an angle of 90° with one another, the recesses (31) in the first pair being open in said predetermined axial direction and the recesses (32) in the second pair being open in an opposite axial direction, said annular rolling element retainer (30) being radially movable with respect to the shaft (9); and
   four rolling elements (34, 35) which are loosely received each in one recess (31, 32), the rolling elements (34) in the first pair of recesses (31) having rolling contact with and forming a first axis of rotation relative to the machine body (1), and the rolling elements (35) in the second pair of recesses (32) having rolling contact with and forming a second axis of rotation relative to a bearing housing (5; 40) associated with said structure, for forming between the machine body (1) and the last mentioned bearing housing (5; 40) a universal link for transmitting axial force.

7. Device as claimed in claim 6, wherein said rolling elements (34, 35) consist of four balls (34, 35), and wherein said cardan-type structure is such that the radial movability of the annular rolling element retainer (30) is achieved by a radial rolling movement between the four balls and the machine body (1) or said bearing housing (5; 40) associated with the said structure.

8. Device as claimed in claim 6, wherein said bearing housing associated with the cardan-type structure is identical with the bearing housing (5) mounted to the machine body (1) by means of said plate-shaped supporting means (22).

9. Device as claimed in claim 6 wherein portions (36, 37) of the machine body (1) and the bearing housing (5; 40), respectively, which are applied against the rolling elements (34, 35) are partly axially introduced into the recess (31, 32), there being a radial play with side walls of said recesses (31, 32), such that a certain tilting of the bearing housing (5) relative to the machine body (1) is possible, at the same time as the retainer (30) is maintained centered with respect to the shaft (9).

10. Device as claimed in claim 1, wherein the bearing member (8) comprises at least one rolling bearing.

11. A device for rotatably mounting a machine element (9), on a machine body (1), comprising:
   a bearing housing (40) for mounting on said machine body (1);
   a bearing member (41) supported by said bearing housing (40) and adapted to guide a shaft (9); and a cardan-type structure adapted to transmit axial bearing load to the machine body (1) in a predetermined axial direction and including both an annular rolling element retainer (30) which is centered with respect to the shaft (9) and has two pairs of diametrically opposed recesses (31, 32), said pairs being at an angle of 90° to one another, the recesses (31) in the first pair being open in said predetermined axial direction and the recesses (32) in the second pair being open in an opposite axial direction, said annular rolling element retainer (30) being radially movable with respect to the shaft (9), and four rolling elements (34, 35) which are loosely received each in one recess (31, 32), the rolling elements (34) in the first pair of recesses (31) having rolling contact with and forming a first axis of rotation relative to the machine body (1), and the rolling elements (35) in the second pair of recesses (32) having rolling contact with and forming a second axis of rotation relative to the bearing housing (40), for forming between the machine body (1) and said bearing housing (40) a universal joint for transmitting axial force.

12. Device as claimed in claim 11, wherein said rolling elements (34, 35) consist of four balls (34, 35), and wherein said cardan-type structure is such that the radial movability of the annular rolling element retainer (30) is achieved by radial rolling between the four balls and the machine body (1) or said bearing housing (5; 40) associated with said structure.

13. Device as claimed in claim 11, wherein portions (36, 37) of the machine body (1) and the bearing housing (5; 40), respectively, which are applied against the rolling elements (34, 35), are partly axially introduced into the recesses (31, 32), there being a radial play with side walls of said recesses (31, 32), such that a certain tilting of the bearing housing (40) relative to the machine body (1) is possible, at the same time as the retainer (30) is maintained centered with respect to the shaft (9).

14. Device as claimed in claim 13, wherein said portions (36, 37) of the machine body (1) and the bearing housing (5), respectively, which are applied against the rolling elements (34, 35), consist of rigidly clamped rollers (36, 37), the centre lines of which are parallel to diameters of the retainer (30) for the rolling elements.

15. Device as claimed in claim 11, further comprising one or more spring means (49) for maintaining the bearing housing (40) resiliently pressed against the rolling element retainer (30).

* * * * *